Nov. 21, 1967 R. L. WALKER 3,353,764

LOW TAPE SENSING APPARATUS

Filed May 25, 1966

INVENTOR.
RICHARD L. WALKER
BY
Warren F. B. Lindsley
ATTORNEY 3,353,764

LOW TAPE SENSING APPARATUS

Richard L. Walker, Phoenix, Ariz., assignor to General Electric Company, a corporation of New York Filed May 25, 1966, Ser. No. 552,733
7 Claims. (Cl. 242—57)

Figure 1:
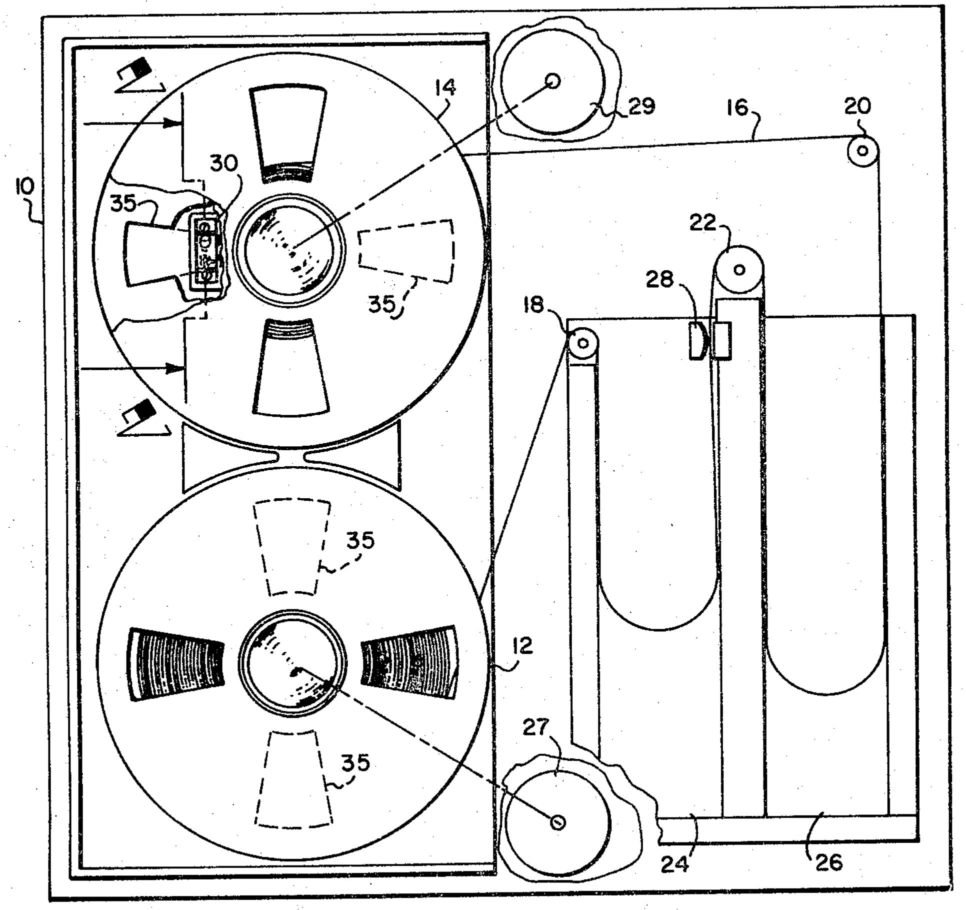

This invention relates to optical sensing apparatus and more particularly to apparatus for sensing a low tape condition in a magnetic tape handler.

In high speed data processing systems, one commonly used data storage medium is an elongated tape of flexible plastic material employing a magnetic coating on one side thereof. Such a medium is commonly referred to as a magnetic tape and is used in tape handlers wherein tape from a supply reel is moved by a rotating capstan past a read/write head, to a take-up reel for storage. The tape handlers perform their operations in response to commands from a central processor of the data processing system and must be capable of moving the tape at a high rate of speed in both forward and reverse directions and must be capable of changing the direction of motion of the tape very rapidly. Accordingly, the tape handler, in response to commands to read or write data on the tape, moves the tape at a high "regulated" speed in a forward direction past the read/write head. In response to certain other commands, the tape handler moves the tape at an equally fast regulated speed in a reverse direction past an erase head. Finally, in response to commands to rewind the tape to its beginning, the tape is rewound onto its supply reel by moving the tape in the reverse direction at a "rewind" speed which is even higher than the regulated speed employed during reading, writing and erasing operations.

A tape handler of a data processing system, if employed most effectively, should remain idle no longer than is necessary. For example, upon completion of a rewind operation, the tape should be started forward immediately in a read or write operation. A sensor arranged proximate to the tape detects a metal leader affixed to the beginning end of the tape as the tape rewinds and signals the tape handler that the rewind operation is completed so that the next operation may be initiated. However, at this moment during the rewind operation the tape is moving at a very high rate of speed with most of the tape being wound on the supply reel. At the instant the beginning of the tape is sensed, the supply reel and tape have substantial inertia in the rewind or reverse direction. To immediately execute a read command requiring a reversal of tape movement at a relatively high rate of speed in the forward direction would result in snapping or breaking of the tape. Accordingly, it is desirable to slow the tape to a regulated speed immediately prior to the time the metal leader at the beginning end of the tape is sensed.

Tape is slowed to a regulated speed in some prior art tape handlers by a packing arm which rests on the tape wound on the supply reel. This packing arm actuates a microswitch which controls the application of a signal to a motor used to drive the tape. When the tape reaches a predetermined level on the supply reel, the position of the arm causes the microswitch to open which, in turn, produces a signal that regulates the tape driving motor. A disadvantage of this means of sensing a low tape condition is that the packing arm resting on the tape causes wear and eventual tape damage.

Other prior art tape handlers employ a light source mounted to direct a beam of light toward the tape wound on the reel. A light sensor is arranged so that light is reflected off the surface of the tape on the reel and into the sensor when only a small quantity of tape remains on the reel. Light falling on the sensor activates it thereby producing a signal causing a tape driving motor to decrease the speed of the tape to a regulated value. Such a system has a disadvantage in that the path of the light between the light source and the sensor is relatively long thereby requiring a relatively high intensity light source and a relatively sensitive sensor for the system to function properly. Another problem of this system is the fact that a sensitive sensor is readily affected by ambient light which may activate the sensor and produce a false indication of the amount of tape remaining on the tape reel.

The present invention alleviates the disadvantages of the prior art by providing a light source mounted adjacent the tape reel with its beam of light directed toward a reflecting marker mounted on an inside wall of the reel. Light from this source is reflected from the marker to a sensor which is mounted near the light source and adjacent to the tape reel. The reflective marker is covered by tape when more than a small part of the tape is wound on the reel so that reflection of light into the sensor cannot occur until the reel is almost empty.

It is, therefore, an object of the present invention to provide an improved low sensor for use in a tape handler.

Another object of this invention is to provide an improved low tape sensor which does not damage the tape.

Still another object of this invention is to provide an improved low tape sensor which can more accurately sense the quantity of tape on a reel than prior art devices.

A further object of this invention is to provide an improved low tape sensor which is less affected by ambient light than prior art optical sensors.

A still further object of this invention is to provide an improved low tape sensor having a shorter distance between the light source and the light sensor than prior art optical sensors.

The foregoing objects are achieved in the instant invention, by providing a reflecting marker mounted on an inside wall of a tape reel with the marker being positioned so that it is covered by tape when more than a small quantity of tape is wound on the reel. A light source having a narrow beam of light is mounted adjacent the reel with its light beam directed through a hole in the reel toward the reflective marker. Mounted adjacent the reel is a light sensor arranged so that the light beam from the source is reflected from the marker to the sensor when less than a predetermined quantity of tape is wound on the reel.

Figure 2:
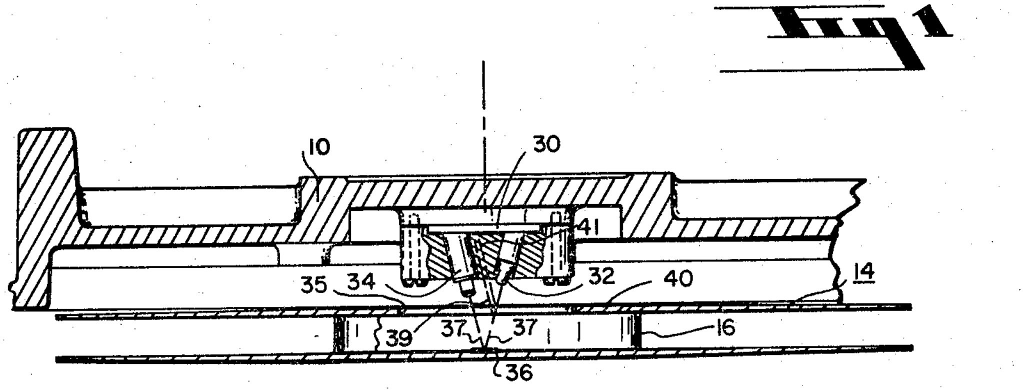

Other objects and advantages of the present invention will be apparent from the following specification when taken in connection with the accompanying drawings wherein:

FIG. 1 is an elevation view of a tape handler embodying the instant invention; and FIG. 2 is an enlarged cross sectional view taken along the line 2—2 of the tape handler shown in FIG. 1 and illustrating the optical sensing apparatus of the present invention.

With reference to the drawing, FIG. 1 illustrates an apparatus utilizing the low tape sensor of the present invention. The mechanical components of the apparatus are mounted upon a panel 10 and include a supply reel 12, a take-up reel 14 and a quantity of a suitable data storage medium shown, for example, in the form of an elongated magnetic tape 16 of flexible plastic material employing a magnetic coating on one side thereof. Tape 16 passing from one reel to the other over a pair of rollers 18 and 20 is driven by a capstan 22 which is connected to a suitable drive motor (not shown). The capstan which drives tape 16 in either a forward or a reverse direction is mounted between a pair of vacuum loop bins 24 and 26. Tape from the supply reel 12 passes over a roller 18, through vacuum bin 24, past a read/write head 28, over capstan 22, through vacuum bin 26, over a roller 20 to the take-up reel 14. Reels 12 and 14 are given rotary motion by a pair of drive motors 27 and 29 suitably connected thereto.

Each of the vacuum bins 24 and 26, positioned between capstan 22 and a different one of the reels 12 or 14, includes a vacuum source (not shown). The vacuum in the bins causes the tape to be drawn therein forming a loop in each bin of a variable length. As well known in the art the vacuum bins buffer the shock of the tape particularly during very fast starting, stopping and reversing movements of the tape. In this manner segments of tape in the immediate vicinity of the read/write head 28 can be effectively isolated from the tape on supply reel 12 and take-up reel 14 thereby making it possible to rapidly accelerate and decelerate the tape by capstan 22 without initially moving the more massive reels 12 and 14. In such an operation, a portion of tape is maintained in each of the bins and this portion lengthens and shortens during supply and take-up operations and provides controlled slack to accommodate the differential accelerations of the tape.

It is the purpose of the above described apparatus to move the tape over the read/write head 28 in order that information may be written onto or read from tape 16. In order that this information transfer may be properly accomplished, the tape must pass over read/write head 28 at a uniform rate of speed regardless of the direction in which it is going. This rate of speed is relatively high and the direction of movement is often reversed quite rapidly so that information may be quickly transferred to or read from various portions of the tape. To achieve this transfer, capstan 22 is normally rotated at a regulated speed in either direction by a bidirectional motor, not shown. In order to reduce the time required to rewind tape 16 onto supply reel 12 an even higher rewind speed is used until the quantity of tape on take-up reel 14 is very small. When less than a predetermined quantity of tape is wound on the take-up reel, an apparatus 30 senses a low tape condition on take-up reel 14 and controls application of a signal which causes the tape speed to decrease to the regulated speed. This apparatus 30 is mounted on panel 10 behind take-up reel 14.

The apparatus 30 for sensing a low tape condition on tape reel 14 illustrated in FIG. 2, comprises a light source 32 providing a narrow beam of light and a light sensor 34 having a narrow angle of acceptance of light. The light source 32 is mounted on panel 10 adjacent to tape reel 14 with the beam of light being directed through a hole 35 in the tape reel toward a reflective marker 36 which is mounted on an inside wall of the tape reel. The apertures or holes 35 in the rear side wall of the reels 12 and 14 are positioned as shown in FIG. 1 opposite the solid portion of the front side wall of the reel. Thus, the marker 36 can be mounted on the inside wall opposite either hole 35. In tape reels having transparent walls the reflective marker may be positioned at various locations on the inside wall of the reel since holes or passageways are not needed to transmit the light through the reel to the reflective marker. When the quantity of tape on take-up reel 14 is small so that marker 36 is not covered by tape, light from source 32 is directed along a path 37 from source 32 to marker 36 and sensor 34. This path 37 is represented in FIG. 2 by the long dashed lines. Light traveling from a source to a sensor is scattered by dust particles and by the fact that the intensity of radiation is inversely proportional to the distance from the source of radiation. Since the total distance between light source 32 and sensor 34 is relatively short, light from source 32 does not scatter as much as it would in prior art optical systems where the distance between the light source and the sensor is greater. Thus, the sensitivity of sensor 34 can be lower than the sensitivity of prior art sensors and still control a signal that causes the speed of the tape to decrease from a relatively high rewind speed to a relatively lower regulated speed. The low sensitivity of sensor 34 prevents ambient light from causing the sensor to be activated. Also the low sensitivity sensor has a lower cost than a sensor having a higher sensitivity.

When more than a small amount of tape is wound on reel 14, the reflective marker 36 is covered so that light from source 32 is no longer reflected into light sensor 34. The quantity of light reflected from the edge of the tape on the reel is insufficient to activate the sensor and additionally, the beam of light is reflected at an angle such that the light is directed away from light sensor 34. Under these conditions the light follows a path 39 which is represented by the short dashed lines in FIG. 2.

Light source 32 and sensor 34 are each mounted on panel 10 at an acute angle to the surface of an outside wall 40 of reel 14 so that light from source 32 which strikes wall 40 is not reflected into sensor 34. Instead, this light follows a path 41 which is represented by the short dashed lines in FIG. 2.

Thus, the present invention discloses a novel low tape sensor which accurately senses a low tape condition. The sensor is inexpensive and is not activated by ambient light.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A tape sensing apparatus comprising: a tape reel having first and second sidewalls; a reflected marker mounted on the inside of said first side wall of said reel, said marker being positioned so that it is covered when a predetermined quantity of tape is wound on said reel; a light source, said source being mounted adjacent said reel and directing light toward said marker, said light striking said marker when less than said predetermined quantity of tape is wound on said reel; and a light sensor mounted adjacent said reel and arranged so that light from said source is reflected from said marker to said sensor when less than said predetermined quantity of tape is wound on said reel.

2. The apparatus as defined in claim 1 wherein: said light sensor has a narrow angle of acceptance of light.

3. The apparatus as defined in claim 1 wherein: said second side wall of said tape reel is provided with an aperture for passing light from said source to said marker.

4. The apparatus as defined in claim 1 wherein: said source provides a narrow beam of light.

5. The apparatus as defined in claim 4 wherein: said light sensor has a narrow angle of acceptance of light.

6. The apparatus as defined in claim 4 wherein: said second side wall of said tape reel is provided with an aperture for passing light from said source to said marker.

7. The apparatus as defined in claim 6 wherein: said light sensor has a narrow angle of acceptance of light.

References Cited

UNITED STATES PATENTS

| | | | |
|---|---|---|---|
| 2,926,860 | 3/1960 | Pomarico | 242—55.12 |
| 3,259,330 | 7/1966 | Baybrick et al. | 242—55.14 X |

FOREIGN PATENTS

| | | |
|---|---|---|
| 882,981 | 11/1961 | Great Britain. |

LEONARD D. CHRISTIAN, *Primary Examiner.*